(12) United States Patent
Pack et al.

(10) Patent No.: US 11,701,802 B2
(45) Date of Patent: Jul. 18, 2023

(54) ENTHALPY-DRIVEN SELF-HARDENING PROCESS AT THE POLYMERIC/METAL LAYER INTERFACE WITH AN INTERDIFFUSION PROCESS

(71) Applicant: GM GLOBAL TECHNOLOGY OPERATIONS LLC, Detroit, MI (US)

(72) Inventors: Seongchan Pack, West Bloomfield, MI (US); Su Jung Han, West Bloomfield, MI (US); Qinglin Zhang, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 670 days.

(21) Appl. No.: 16/674,036

(22) Filed: Nov. 5, 2019

(65) Prior Publication Data

US 2021/0129392 A1 May 6, 2021

(51) Int. Cl.
*C23C 4/06* (2016.01)
*C23C 4/02* (2006.01)
*B29C 37/00* (2006.01)
*B33Y 70/00* (2020.01)
*B33Y 10/00* (2015.01)

(52) U.S. Cl.
CPC .......... *B29C 37/0028* (2013.01); *B33Y 70/00* (2014.12); *C23C 4/02* (2013.01); *C23C 4/06* (2013.01); *B33Y 10/00* (2014.12)

(58) Field of Classification Search
CPC ..... B29C 37/0028; B33Y 70/00; B33Y 10/00; B33Y 80/00; C23C 4/02; C23C 4/06; C23C 4/12; C23C 4/04; C23C 6/00; C23C 4/08; C23C 4/213–16; C08J 7/06; B22F 3/115

See application file for complete search history.

(56) References Cited

U.S. PATENT DOCUMENTS

| | | | |
|---|---|---|---|
| 5,709,957 A | 1/1998 | Chiang et al. | |
| 7,220,671 B2 | 5/2007 | Simka et al. | |
| 7,320,832 B2 | 1/2008 | Palumbo et al. | |
| 8,287,673 B2 | 10/2012 | Tucker et al. | |
| 8,911,878 B2 | 12/2014 | Tomantschger et al. | |
| 10,189,113 B2 | 1/2019 | Xiao et al. | |
| 10,196,739 B2 | 2/2019 | Haack et al. | |
| 10,272,469 B2 | 4/2019 | Landa et al. | |
| 2002/0086118 A1* | 7/2002 | Chang | H01J 37/32477 428/458 |

(Continued)

FOREIGN PATENT DOCUMENTS

| | | |
|---|---|---|
| CN | 106567028 A | 4/2017 |
| EP | 2570258 A1 | 3/2013 |

*Primary Examiner* — Dah-Wei D. Yuan
*Assistant Examiner* — Nga Leung V Law
(74) *Attorney, Agent, or Firm* — Vivacqua Crane PLLC

(57) ABSTRACT

A method of creating an interface includes: a) adding organometallic compounds to a polymeric material to create an interfacial layer; b) placing the polymeric material having the interfacial layer in a mold; c) heating a deposit material until the deposit material has a predetermined-minimized volumetric density; and d) depositing the deposit material on the interfacial layer. The latent heat of the molten metallic material transfers to the interfacial layer to create chemical bonds and physical interlocks between the interfacial layer and the metallic material. The deposit material cools to form solidified layer on the interfacial layer.

5 Claims, 2 Drawing Sheets

(56) References Cited

U.S. PATENT DOCUMENTS

| | | | |
|---|---|---|---|
| 2004/0219369 A1 | 11/2004 | Garg et al. | |
| 2006/0103073 A1* | 5/2006 | Khonsari | F16J 15/3404 |
| | | | 277/359 |
| 2009/0130466 A1 | 5/2009 | Cheng et al. | |
| 2015/0037551 A1 | 2/2015 | Garcia Fuentes et al. | |
| 2015/0050507 A1 | 2/2015 | Hinge et al. | |
| 2015/0064358 A1* | 3/2015 | Seok | C23C 4/134 |
| | | | 106/286.6 |
| 2016/0369419 A1* | 12/2016 | Miarecki | C23C 18/1633 |
| 2017/0073816 A1* | 3/2017 | Hyman | C23C 14/021 |
| 2017/0144270 A1* | 5/2017 | Twomey | B24C 1/00 |
| 2019/0098767 A1 | 3/2019 | Hasegawa et al. | |
| 2019/0186842 A1* | 6/2019 | Chiang | H01L 23/427 |
| 2019/0190106 A1* | 6/2019 | Kamgaing | H01P 3/121 |
| 2022/0093343 A1* | 3/2022 | Cain | H01G 9/15 |

* cited by examiner

ENTHALPY-DRIVEN SELF-HARDENING PROCESS AT THE POLYMERIC/METAL LAYER INTERFACE WITH AN INTERDIFFUSION PROCESS

INTRODUCTION

The present disclosure relates to a method for creating a robust interface between a polymer layer and a metal layer using interdiffusion. More particularly, the present disclosure describes an enthalpy-driven self-hardening process at the polymeric/metal interface with an interdiffusion process. The present disclosure also relates to an assembly including a robust interface between a metal layer and a polymeric layer.

Sometimes dissimilar materials have to be coupled to each other. Due to the mismatch in the coefficient of thermal expansions of these dissimilar materials, the joints between these dissimilar materials may be delaminated at, for example, high temperatures. Further, mechanical interlocking in over-molding processes cannot make effective interface in load-bearing applications, because of the constrained geometry. It is therefore desirable to develop a method for making robust interfaces between dissimilar materials.

SUMMARY

The present disclosure describes a method of creating a robust interface between a polymer layer and a metallic layer by using an interdiffusion process of organometallic compounds. The interdiffusion process is the result of a volumetric density changes of thermally induced particles. This method is therefore an enthalpy-driven process, which results in the self-hardening of the interface at a micro-meso scale.

The presently disclosed method of creating an interface includes: a) adding organometallic compounds to either a surface of a polymeric material or molten polymeric compounding by changing its surface energy to create an interfacial layer; b) placing the polymeric material having the interfacial layer in a mold; c) heating a deposit material (e.g., metallic material, a ceramic material, or a composite material) until volumetric density of the deposit material is minimized; and e) transferring the latent heat, as a result of a change in the volume of the deposit material, to the interfacial layer on the polymeric material. This transfer of the latent heat results in creating chemical bonds and physical interlocks between the interfacial layer and the deposit material. The interfacial layer is formed with the solidified materials.

The volumetric density of the deposit material linearly decreases as a temperature of the deposit material increases. The latent heat of the metallic material transfers to the interfacial layer as a result of the minimized volumetric density of the metallic material. The formation of the solidified deposit layer maximizes a strength of an interface between the interfacial layer and the solidified metal layer. Depositing the metallic, ceramic, or composite powder/wire may include spraying metallic, ceramic, or composite powder directly onto the interfacial layer. Alternatively or additionally, depositing the heated metallic, ceramic, or composite material may include 3D printing the deposit material directly onto the interfacial layer.

The organometallic compounds may include at least one chosen from silicon, phosphorus, and sulfur. The deposit material may include at least one chosen from zinc-based alloy, aluminum-based alloy, tin-based alloy, copper-based alloy, aluminum-silicon base composite, nickel-based alloy, or graphite-based composite to create a chemical bonding that causes the organometallic compounds to diffuse to the deposit material. A lower surface activation energy of the deposit material on the interfacial layer causes the deposit material to chemically react with the inorganic additives in the organometallic compounds. Depositing the deposit material on the interfacial layer may causes a physical diffusion between the deposit material and the interfacial layer while chemical bonding takes places. The chemical bonding may take place by sharing electrons between the deposit material and the interfacial layer. The chemical bonding may take place by coupling with anion and cation molecules.

The present disclosure also describes an assembly. The assembly includes a polymeric material, a deposit material, and an interfacial layer energetically interconnecting the polymeric material and the metallic material. The interfacial layer includes organometallic compounds. The interfacial layer may be chemically bonded with the deposit material. The interfacial layer and the deposit material may be mechanically interlock between each other. The deposit material is configured as a solidified layer.

The organometallic compounds may include at least one chosen from silicon, phosphorus, and sulfur. The deposit material may include at least one chosen from zinc-based alloy, aluminum-based alloy, tin-based alloy, copper-based alloy, nickel-based alloy, iron-based alloy, aluminum-silicon base composite, or graphite-based composite. The interfacial layer may be configured as a polymeric matrix including the organometallic compounds. The interfacial layer may include inorganic additives. The polymeric material may have a first coefficient of thermal expansion, the metallic material has a second coefficient of thermal expansion, and the first coefficient of thermal expansion is different from the second coefficient of thermal expansion. At least one ionic bond may chemically bond the interfacial layer and the deposit material. At least one covalent bond and one Van der Waals interaction may chemically bond the interfacial layer and the deposit material.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

The following detailed description is merely exemplary in nature and is not intended to limit the application and uses. Furthermore, there is no intention to be bound by expressed or implied theory presented in the preceding introduction, summary or the following detailed description.

Embodiments of the present disclosure may be described herein in terms of functional and/or logical block components and various processing steps. It should be appreciated that such block components may be realized by a number of hardware components configured to perform the specified functions. In addition, those skilled in the art will appreciate that embodiments of the present disclosure may be practiced in conjunction with a number of systems, and that the systems described herein are merely exemplary embodiments of the present disclosure.

Figure 1:
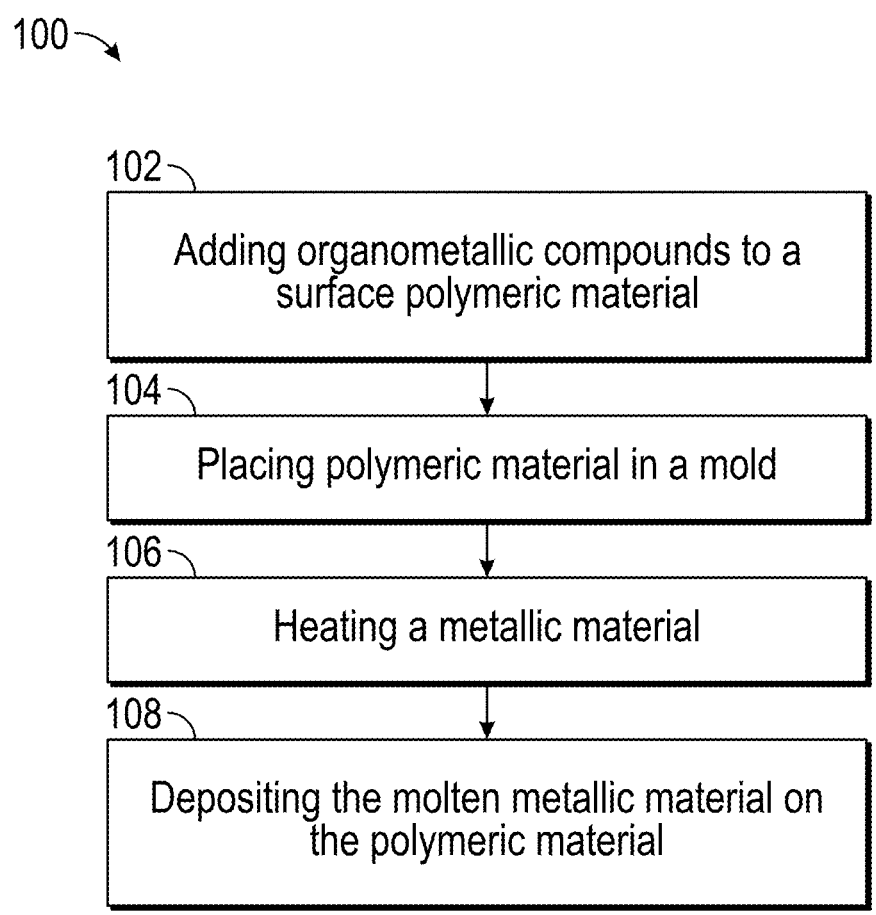
FIG. 1 is a flowchart of a method for creating an interface between a polymeric layer and a metal layer.
Figure 4:
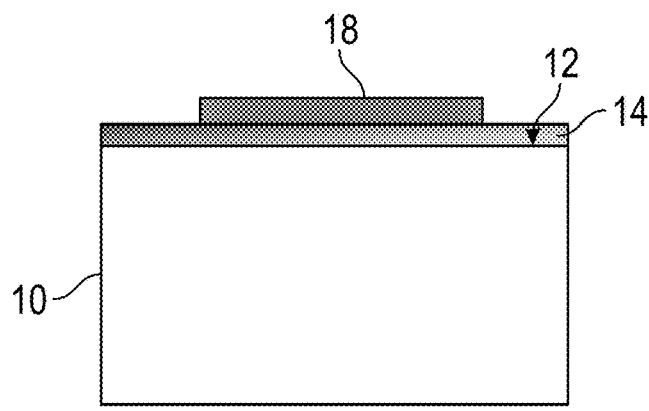
FIG. 4 is a schematic diagram illustrating a solidified interfacial layer disposed between the solidified metallic material and the polymeric material.

FIG. 1 is a flowchart of a method 100 for creating an interface. The method 100 begins at block 102. At block 102, an interfacial layer 14 is created. To do so, organometallic compounds are added to a polymeric material 10. Specifically, the organometallic compounds may be added directly on a surface 12 of the polymeric material 10 to create the interfacial layer 14 (FIG. 4). Alternatively or additionally, compounding may be used. The "compounding" is a process of melt blending polymers with other additives. Compounding starts with a base polymer (i.e., the polymeric material 10). The polymeric material 10 and the additives (e.g., the organometallic compounds) are fed through an extruder where they are combined. The melted compound may then exit the extruder. The organometallic compounds may be included in a polymeric matrix 16. Thus, the polymeric matrix 16 includes the organometallic compounds. The organometallic compounds may include silicon, phosphorus, and/or sulfur. The organometallic compounds have a variety of oxidation sates to enrich the surface 12 of the polymeric material and/or segregate the organometallic compounds. The polymeric material 10 may be configured as a polymeric layer. After block 102, the method 100 proceeds to block 104.

At block 104, the polymeric material 10 (along with the interfacial layer 14) is placed inside a mold. Alternatively, the polymeric material 10 and the interfacial layer 14 may be placed on a fixture, a table, or any other support device. Then, the method 100 proceeds to block 106.

At block 106, a deposit material 18 is heated until the deposit material has a predetermined-minimized volumetric density. The predetermined-minimized volumetric density is determined by conducting tests. After heating, the deposit material is melted. The deposit material 18 may be a metallic material, a ceramic material, and/or a composite material. The deposit material 18 may be configured as metallic particles and/or metallic powder. The reduced volumetric density of the molten deposit material 18 leads to create an activated interface. In other words, the predetermined-minimized volumetric density of the deposit material changes the surface energy of the deposit material 18. The volumetric density of the molten deposit material 18 linearly decreases as temperature increases (i.e., shrinkage factor). The deposit material 18 is heated until it is melted. A suitable heat source, such as electric arc, combustion, or laser, may be used to heat the deposit material 18. Such suitable source has to provide sufficient heat to melt the deposit material 18. The deposit material 18 may include zinc-based alloy, aluminum-based alloy, tin-based alloy, copper-based alloy and/or nickel-based alloy to create the chemical bonding that causes the organometallic compounds to diffuse to the surface 12 of the polymeric material 10. The method 100 then proceeds to block 108.

Figure 2:
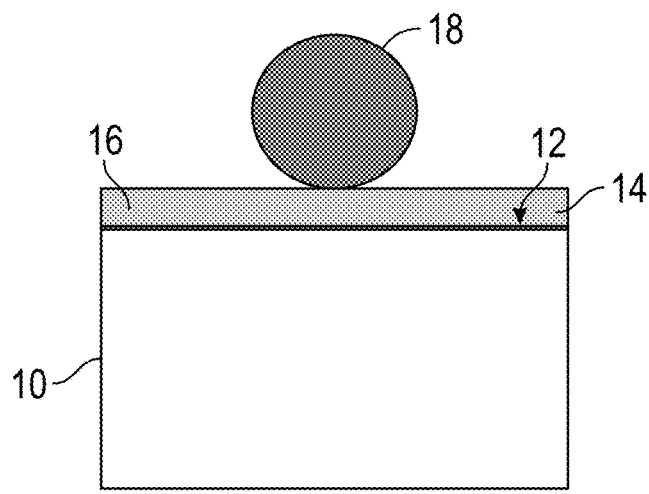
FIG. 2 is a schematic diagram of the molten metallic being deposited on the interfacial layer that includes the organometallic compounds.
Figure 3:
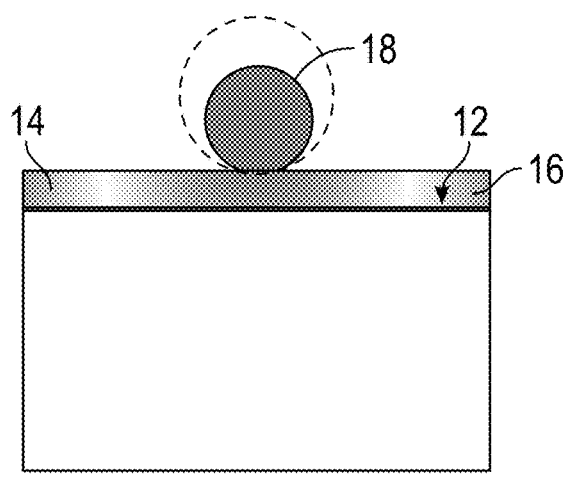
FIG. 3 is a schematic diagram illustrating the transfer of latent heat from the molten metallic material to the interfacial layer as a result of reduced density of the molten metallic material.

At block 108, the molten deposit material 18 is deposited on the interfacial layer 14 as shown in FIG. 2. As such, the interfacial layer 14 is disposed between the molten deposit material 18 and the polymeric material 10. The molten deposit material 18 may be deposited on the interfacial layer 14 by spraying molten/semi-molten metallic powder (or metallic particles) directly onto the interfacial layer 14 or by 3D printing the molten deposit material 18 directly onto the interfacial layer 14. The latent heat of the deposit material 18 transfers to the interfacial layer 14 to create chemical bonds and mechanical interlocks between the interfacial layer 14 and the deposit material 18. Depositing the molten deposit material 18 on the interfacial layer 14 minimizes its surface activation energy to cause the molten deposit material 18 to chemically react with inorganic additives in the organometallic compounds. deposit material 18. As a consequence, the interfacial layer 14 undergoes a diffusion process when the molten deposit material 18 is deposited on the interfacial layer 14. The chemical bonding takes place by sharing electrons between the deposit material 18 and the interfacial layer 14. The chemical bonding may also take place by coupling with anion and cation molecules. Ionic, Van der Waals, and/or covalent bonding and an interdiffusion process may occur at the interface between the deposit material 18 and the interfacial layer 14. The degree of electron affinity varies at the interface. Depositing the molten deposit material 18 on the interfacial layer 14 causes a physical diffusion between the molten deposit material 18 and the interfacial layer 14 while chemical bonding takes places. The deposit material 18 then cools to form a solidified metal layer at the interfacial layer 14. The deposit material 18 may be cooled, for example, through natural convection and/or forced convection until the phase of the molten deposit material 18 changes from a liquid state to a solid state. The formation of the solidified metal layer maximizes the hardness of the interface between the interfacial layer 14 and the deposit material 18, which is configured as a solidified metal layer. The deposit material 18 is phase transferred from its liquid state to its solid state on the interfacial layer 14. A physical diffusion process occurs while chemical bonding takes place in either sharing electrons or coupling with anion and cation molecules. As shown in FIG. 3, the potential energy is transferred to the interface as the volumetric density of the deposit material 18 decrease. As a result, the interface between the deposit material 18 and the polymeric material 10 is hardened by the formation of the solidified metal layer.

With reference to FIG. 4, the assembly 9 is the result of executing the method 100 described above. The assembly 9 includes the polymeric material 10, the deposit material 18 (which is configured as a solidified metal layer), and the interfacial layer 14 that interconnects the polymeric material 10 and the deposit material 18. The interfacial layer 14 includes organometallic compounds. The interfacial layer 14 is chemically bonded with the deposit material 18. The interfacial layer 14 and the deposit material 18 are physically interlock between each other. The deposit material 18 is configured as a solidified metal layer. As discussed above, the organometallic compounds may include silicon, phosphorus, and/or sulfur. As discussed above, the deposit material 18 may include a zinc-based alloy, an aluminum-based alloy, a tin-based alloy, a copper-based alloy, a nickel-based alloy, an iron-based alloy, an aluminum-silicon composite, and a graphite-based composite. The interfacial layer 14 may be configured as a polymeric matrix including the organometallic compounds. The interfacial layer 14 may include inorganic additives. The polymeric material 10 has a first coefficient of thermal expansion, and the deposit material 18 has a second coefficient of thermal expansion. The first coefficient of thermal expansion is different from the second coefficient of thermal expansion. Ionic bonds, Van der Waals bonds, and/or covalent bonds chemically bonds the interfacial layer 14 and the deposit material 18.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method of creating an interface, comprising:
adding a plurality of organometallic compounds to a polymeric material to create an interfacial layer;
placing the interfacial layer in a mold;
heating a deposit material until the deposit material has a predetermined-minimized volumetric density, wherein the deposit material is a ceramic material, and the deposit material is melted after heating the deposit material;
depositing the deposit material on the interfacial layer;
wherein the deposit material cools to form a solidified deposit layer on the interfacial layer; and
wherein a volumetric density of the deposit material linearly decreases as a temperature of the deposit material increases, and the latent heat of the deposit material transfers to the interfacial layer as a result of the predetermined-minimized volumetric density of the deposit material; and
wherein depositing the deposit material includes 3D printing the deposit material directly onto the interfacial layer.

2. The method of claim 1, wherein adding the plurality of organometallic compounds to the polymeric material includes at least one chosen from adding the plurality of organometallic compounds to a surface of the polymeric material and compounding the polymeric material with the plurality of organometallic compounds.

3. The method of claim 1, wherein the organometallic compounds include at least one chosen from silicon, phosphorus, and sulfur.

4. The method of claim 1, wherein the deposit material includes a graphite-based composite.

5. The method of claim 1, wherein depositing the deposit material on the interfacial layer causes a physical diffusion between the deposit material and the interfacial layer.

* * * * *